(12) United States Patent
Templeton

(10) Patent No.: US 6,401,210 B1
(45) Date of Patent: Jun. 4, 2002

(54) METHOD OF MANAGING COMPUTER VIRUS INFECTED FILES

(75) Inventor: Randall F. Templeton, Provo, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/159,311

(22) Filed: Sep. 23, 1998

(51) Int. Cl.⁷ .................................................. G06F 11/30
(52) U.S. Cl. ........................ 713/200; 713/188; 713/201; 714/38
(58) Field of Search .................................. 713/200, 201, 713/188, 187; 714/38, 26, 39, 36

(56) References Cited

U.S. PATENT DOCUMENTS

| | | | | |
|---|---|---|---|---|
| 5,485,575 A | * | 1/1996 | Chess et al. ................ | 714/38 |
| 5,613,002 A | * | 3/1997 | Kephart et al. ............. | 713/200 |
| 5,623,600 A | * | 4/1997 | Ji et al. ...................... | 713/201 |
| 5,918,008 A | * | 6/1999 | Togawa et al. ............. | 713/200 |
| 6,067,410 A | * | 5/2000 | Nachenberg ................. | 703/28 |
| 6,108,799 A | * | 8/2000 | Boulay et al. ................ | 714/38 |

\* cited by examiner

Primary Examiner—Gail Hayes
Assistant Examiner—Ho S. Song
(74) Attorney, Agent, or Firm—Steven P. Skabrat

(57) ABSTRACT

Management of files infected by computer viruses is accomplished by creating a first file in a directory, copying a virus infected file to the first file, scrambling contents of the first file, and deleting the virus infected file. A system for managing computer virus infected files includes scrambler logic to scramble the contents of a virus infected file to produce a scrambled virus infected file, a virus bin to safely store the scrambled virus infected file, and unscrambler logic to unscramble the scrambled virus infected file to reproduce the virus infected file for further analysis or cleaning.

16 Claims, 9 Drawing Sheets

METHOD OF MANAGING COMPUTER VIRUS INFECTED FILES

BACKGROUND

1. Field

The present invention relates generally to information processing systems and, more specifically, to management of files infected by a computer virus.

2. Description

In the past few years, computer viruses have caused damage to processing systems throughout the world. A computer virus is a program capable of operation on a system (such as a personal computer) that is self-replicating and that can "infect" other programs by modifying them or their environment such that a call to an infected program implies a call to a possibly evolved, and in most cases, functionally similar version of the virus. Detection, identification, and handling of computer viruses is the focus of commercial software products called "anti-virus" programs.

Anti-virus programs typically scan files on a processing system word by word or byte by byte to detect a virus by identifying a "signature string" of digital values in a file. The detection of a particular signature string indicates that identifiable virus code is present in the file. Once the virus is detected and identified, the anti-virus program responds in one of several ways. The anti-virus program may simply delete the file from the computer system, thereby removing the virus, but this action also destroys the file's original contents. This result may entail considerable and possibly irreparable damage to a user's data, programs or file systems. Alternatively, the anti-virus program may attempt to "clean" the infected file by removing virus code from the file, thereby restoring the file to its original functional state. A method often used to clean the file is to simply overwrite suspected virus code with a string of zeroes. This destroys the virus. However, if a virus is detected in error (e.g., a false positive is indicated by the anti-virus program) or the wrong bytes in the file are overwritten, then the attempt to clean the infected file results in the partial destruction of the original file. This may result in the file being unusable. If the attempt to clean the infected file fails, the infected file is usually deleted. In other cases, the anti-virus program (which may be frequently updated to handle newly discovered viruses) may not yet have the logic to clean the specific virus found in the infected file. Some anti-virus products may rename the infected file or move it to another storage location to reduce the probability of the file being accidentally used or transferred, so the virus will not be spread. However, both of these options leave the virus on the processing system in files accessible to the user and the virus may still be inadvertently spread if the file is executed or transferred to another processing system.

Thus, existing anti-virus techniques are deficient in how they manage files containing computer viruses.

SUMMARY

An embodiment of the present invention is a method of managing a file infected by at least one computer virus. The method includes creating a first file in a directory, copying the virus infected file to the first file, scrambling the contents of the first file, and deleting the virus infected file.

Another embodiment of the present invention is a system for managing computer virus infected files. The system includes scrambler logic to scramble the contents of a virus infected file to produce a scrambled virus infected file, a virus bin to safely store the scrambled virus infected file, and unscrambler logic to unscramble the scrambled virus infected file to reproduce the virus infected file.

BRIEF DESCRIPTION OF THE DRAWINGS

The features and advantages of the present invention will become apparent from the following detailed description of the present invention in which.

DETAILED DESCRIPTION

An embodiment of the present invention includes a method of managing virus infected files which employs an easily accessible repository. This repository, also called a virus bin, may be used to store files which have been identified as being contaminated by a virus in such a way as to render the virus inoperable. This reduces the possibility that the virus may be accidentally spread or activated.

Figure 1:
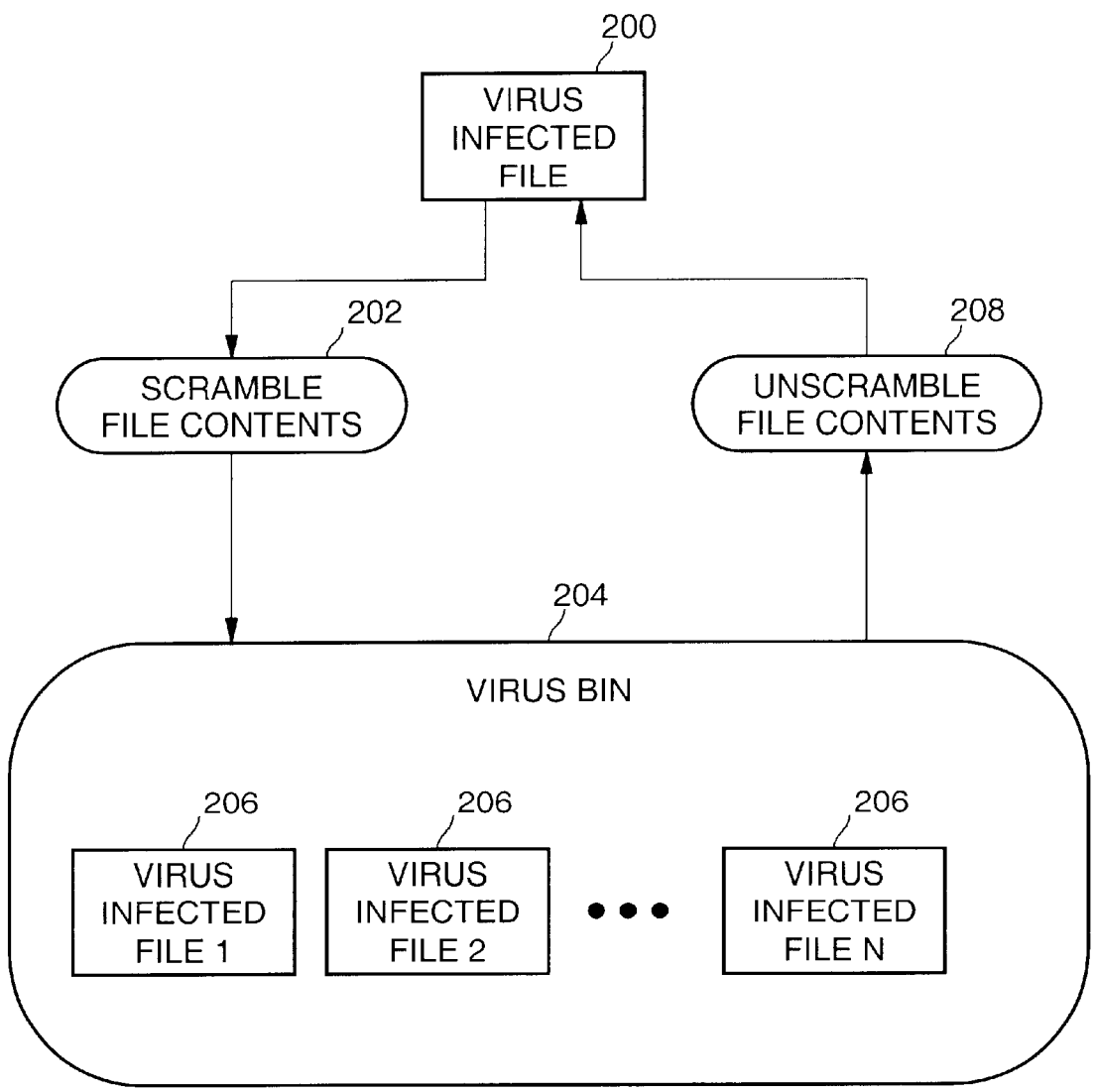
FIG. 1 is a diagram illustrating a virus bin according to one embodiment of the present invention.

The virus bin is a repository of recoverable virus infected files. When a virus infected file is placed in the virus bin, the contents of the file may be scrambled, so the virus it contains may no longer be recognizable or executable. Infected files in the virus bin may be recovered by unscrambling the file and thus restoring it to its previous state. FIG. 1 is a diagram illustrating a virus bin of a computer system according to an embodiment of the present invention. A virus infected file 200 may be scrambled by scramble file contents logic 202 and moved to the virus bin 204. The virus bin may contain a plurality of virus infected files 206. In one embodiment, scramble file contents logic 202 scrambles the virus infected file by performing an exclusive OR (XOR) operation applied to at least a portion of the bytes of the virus infected file with the value 0FF (hexadecimal). This essentially inverts the selected bits of the file and makes code present in these portions of the file unusable. In other embodiments, other scrambling operations well-known in the art may be used, such as encryption, for example. When the file is in the virus bin 204, it may not be detected by anti-virus processes, nor can it be directly or inadvertently accessed by a user of the processing system. Since the file is scrambled, anti-virus processes cannot detect any signature strings of known viruses in the file. Furthermore, the infected file is no longer visible in the directly accessible file structure of the system; hence users may be prevented from intentionally or accidentally executing the file or transferring it to another location or system during normal user operations. When the infected file is desired (perhaps for attempted cleaning or analysis purposes), the file may be unscrambled to reproduce the virus infected file. Unscramble file contents logic 208 unscrambles a virus infected file .206 stored in the virus bin 204 and restores it to original virus infected file 200. Unscramble file contents logic 208 performs the inverse operation of scramble file contents logic 202.

The virus bin capability may be used to manage virus infected files to protect users, especially in systems coupled to a local area network (LAN) and which share files and application programs, although the invention is not limited in scope in this respect. In one embodiment, the virus bin capability is a feature of a LAN-based system management program, although the invention is not limited in this respect. The virus bin may be used to store virus infected files in a state where the virus may not be executed, copied, or detected. The virus is, in effect, inert. Thus, the users of the system are protected from the virus and it may not be spread further. At a later point in time, the infected file may be restored (possibly in a special directory accessible only to system operators) so that cleaning or other analysis may be performed. A copy of the infected file may be saved in the virus bin in case an attempted cleaning produces an undesired modification of the infected file that was unscrambled. When the infected file is removed from the virus bin, it may be restored to its original location in the system's file structure, because this information may be stored with the infected file in the virus bin. The file information stored in the virus bin along with the infected file may comprise the file name, the original date of the file, the original location of the file in the system's file structure, and the name of the virus, for example. Of course, in other embodiments, other information relating to the file and the virus may also be stored.

In one embodiment, the virus bin may comprise a database, controlled access directory, or other data structure holding a plurality of files and information fields related to the files. The virus bin may be stored in any data storage device of the system. Control of the virus bin may be provided by an anti-virus process, which may be a standalone application program, part of a system management program, or part of an operating system. In one embodiment, the anti-virus process may be used to continually monitor a system for viruses via a memory-resident program providing real-time protection. The anti-virus process may be used to scan one or more files in a file structure for a virus. Prior to scanning, the anti-virus process may prompt the user to select an option to deal with viruses that may be detected. In one embodiment, the options comprise: attempt to clean the file, delete the file, rename the file, or move the file to the virus bin. After the user selects an option, the anti-virus process scans one or more selected files. In alternate embodiments, the user may be individually prompted to select an option for each file in which a virus is detected. If the virus bin option is selected, the anti-virus process moves an infected file to the virus bin for safe-keeping and stores information related to the infected file. Information regarding files placed in the virus bin may be viewed by the user at any time using a well-known graphical user interface. The anti-virus process may present the user with several options for subsequently managing the infected files. In one embodiment, the user may direct that the infected files be cleaned of a virus, restored to the original storage location without cleaning, deleted, saved to a different storage location and possibly renamed, or sent to another user while disabled or scrambled.

Figure 2:
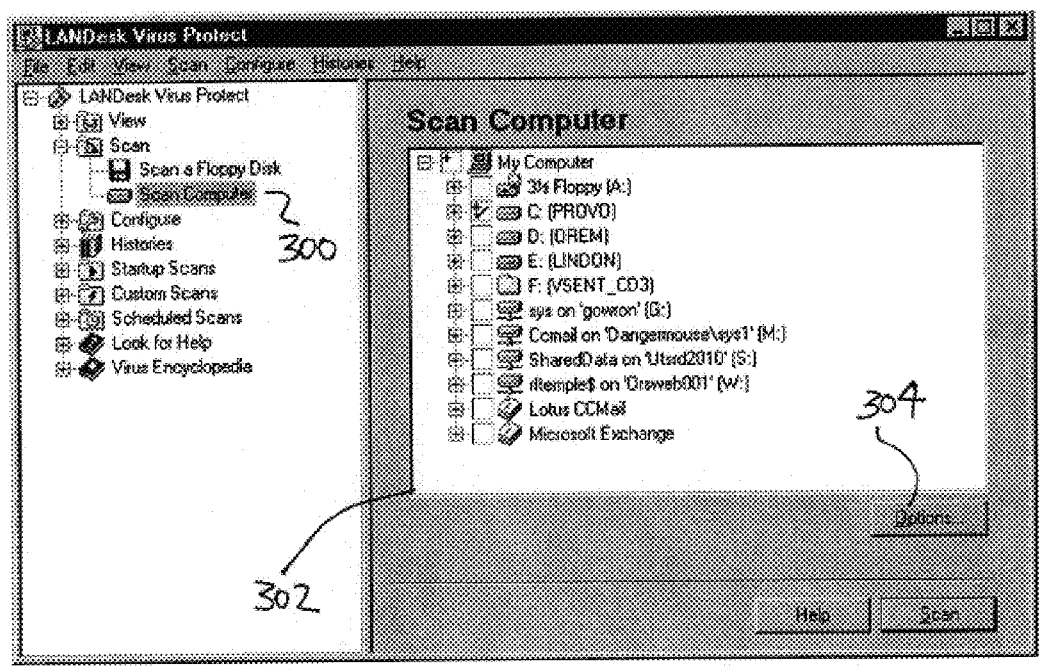
FIG. 2 is a diagram of a display illustrating scan options according to an embodiment of the present invention.
Figure 3:
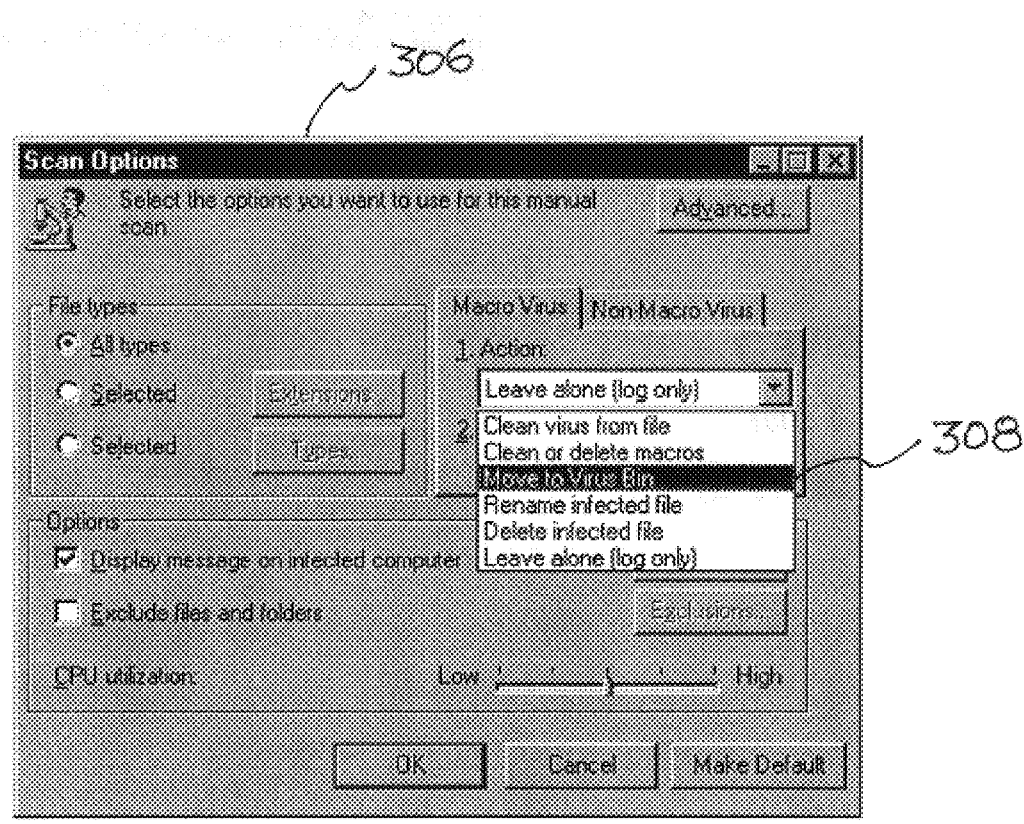
FIG. 3 is a diagram of a display illustrating a scan options dialog according to an embodiment of the present invention.

In one embodiment, the virus bin may be implemented as a scan option in a LAN-based anti-virus process. FIG. 2 is a diagram of a display illustrating scan options according to an embodiment of the present invention. The virus bin may be activated by selecting the Scan Computer 300 option. Once the virus bin is selected, a corresponding window 302 may be displayed to allow the user to select the files, folders, and drives to be scanned for viruses. By selecting an Options button 304, the user may cause the display of a Scan Options Dialog window for configuring various scan options. FIG. 3 is a diagram of a display illustrating a scan options dialog according to an embodiment of the present invention. The Scan Options Dialog window 306 presents the user with a set of actions to automatically perform when a virus is detected. One of the options may be Move To Virus Bin 308. If the user chooses this option, all virus infected files will be moved into the virus bin automatically when the files are scanned and a virus is detected. This option may be applied to macro viruses (viruses contained in documents used by application programs such as Word™ or Excel™ (both available from Microsoft Corporation), for example), or non-macro viruses (e.g., viruses contained in executable programs or boot sectors, for example).

Figure 4:
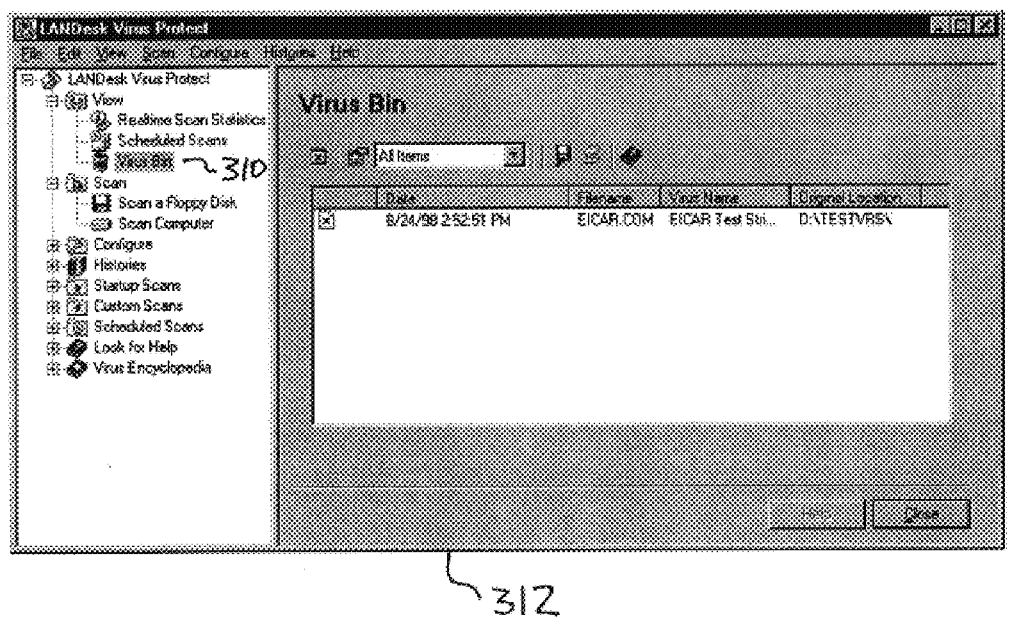
FIG. 4 is a diagram of a display illustrating the viewing of the contents of the virus bin according to an embodiment of the present invention.

The user may view the contents of the virus bin at any time by selecting a View Virus Bin option in the anti-virus process. FIG. 4 is a diagram of a display illustrating the viewing of the contents of the virus bin according to an embodiment of the present invention. View Virus Bin button 310 provides the user with a selection to display the contents of the virus bin. When the View Virus Bin button is selected, a virus bin contents window 312 may be displayed. The virus bin may show information about virus infected files, such as the date the file was added to the virus bin, the file name, viruses that the file contains, and the original location of the file on the system before it was moved to the virus bin, for example.

Figure 5:
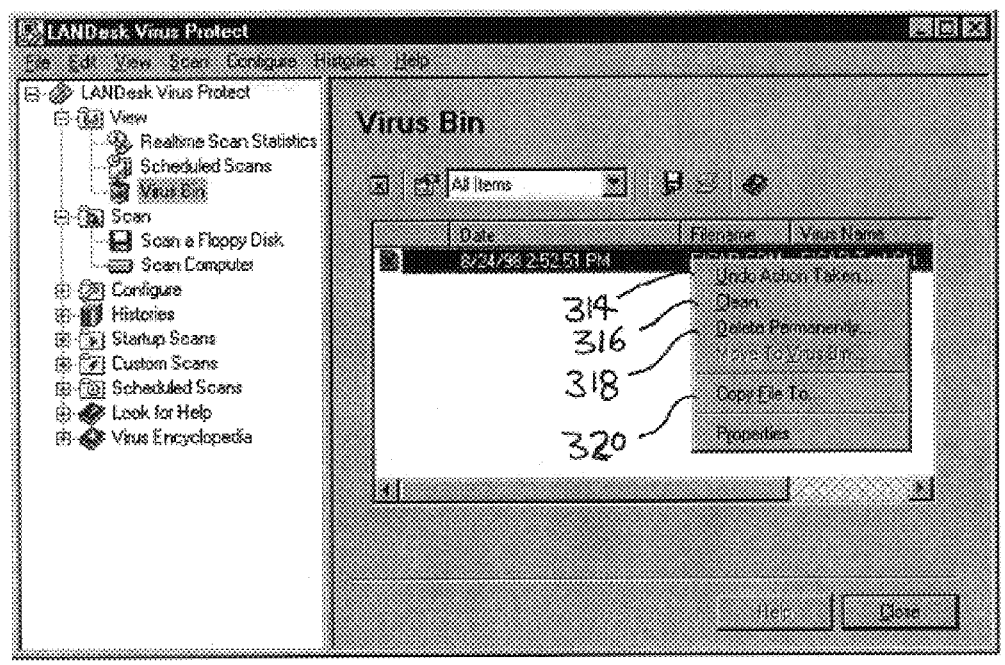
FIG. 5 is a diagram of a display illustrating additional virus bin actions according to an embodiment of the present invention.

Once the virus infected file is safely moved into the virus bin, the virus it contains can no longer be inadvertently spread to other programs or otherwise infect the system. In one embodiment, the user may take additional actions on a file in the virus bin by selecting a file and choosing one of the additional actions from a resulting pop-up menu. FIG. 5 is a diagram of a display illustrating additional virus bin actions according to an embodiment of the present invention. The Undo Action Taken option 314 restores the file to its original location. The Clean option 316 attempts to remove the virus from the file and then restore the file to its original location. The Delete Permanently option 318 removes the file from the virus bin and deletes it. The Copy File To option 320 allows the user to copy the infected file to another location.

Figure 6:
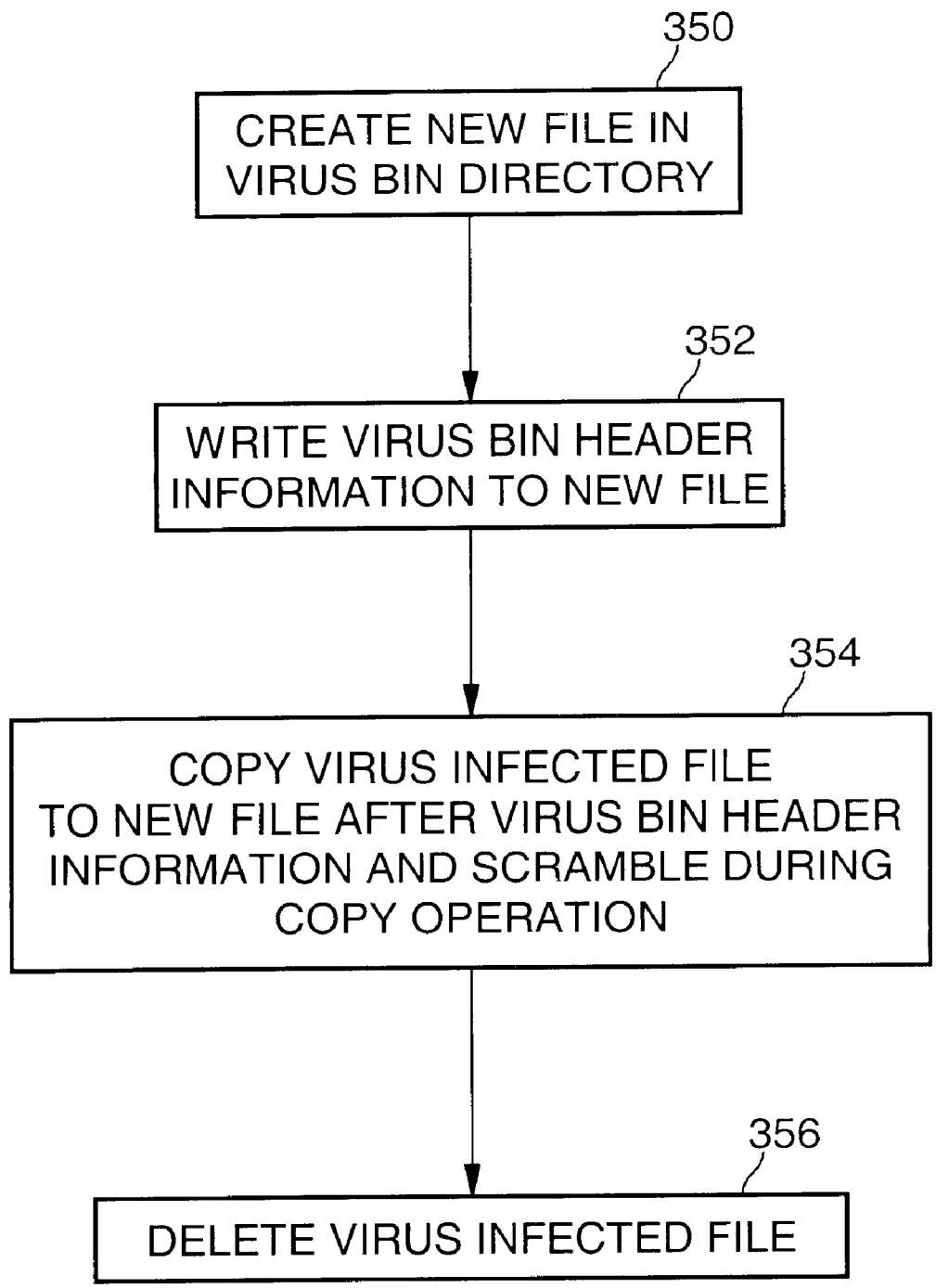
FIG. 6 is a flow diagram of adding a file to the virus bin according to an embodiment of the present invention.

FIG. 6 is a flow diagram of adding a file to the virus bin for this particular embodiment. At block 350, a new file may be created in a virus bin directory on data storage 422 of system 400. At block 352, virus bin header information may be written to the newly created file. The virus bin header information may comprise the current date, file name, original location, original file creation date and the last modified date, file attributes, and the name of the virus infecting the file. At block 354, the virus infected file may be scrambled or encrypted and copied to the virus bin in a location of the new file following the virus bin header information. In another embodiment, the virus bin header information may be stored in the virus bin separate from the scrambled infected files. The scrambling or encrypted operation may be performed on a byte by byte basis during the copying operation. At block 356, the virus infected file may be deleted.

Figure 7:
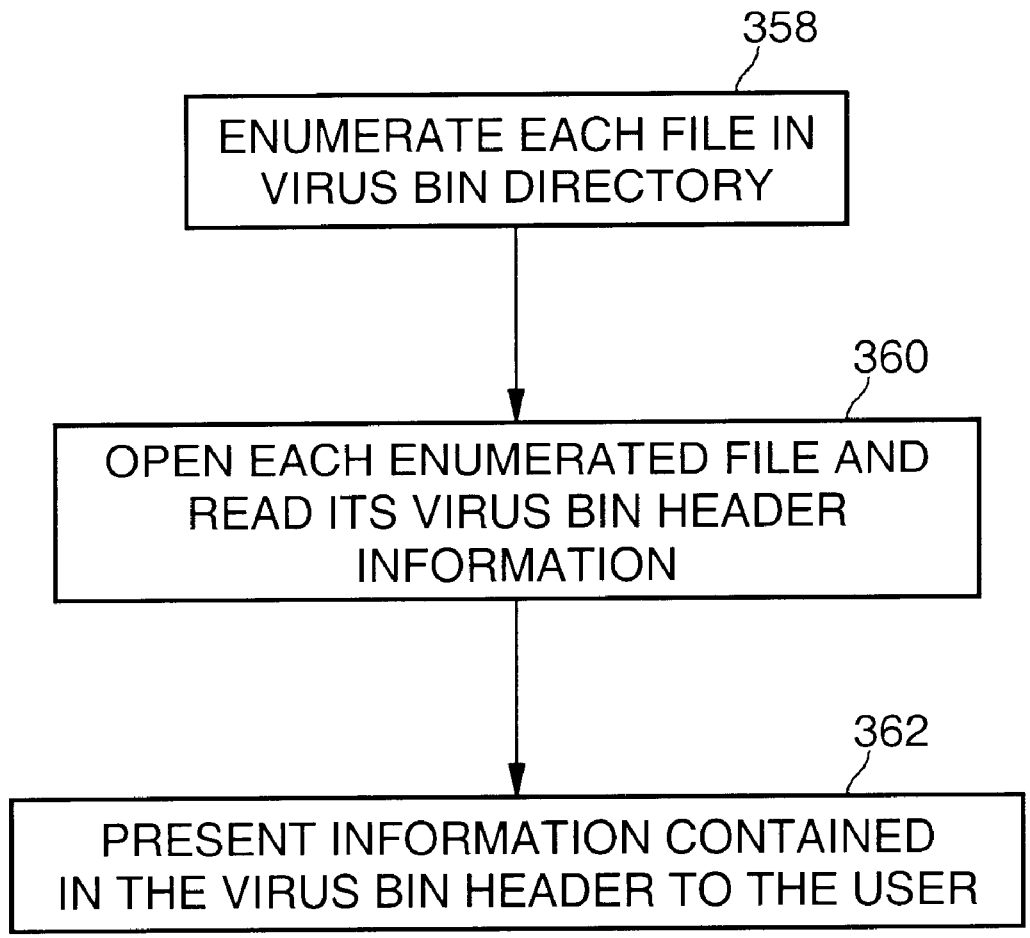
FIG. 7 is a flow diagram of enumerating the contents of the virus bin according to an embodiment of the present invention.

FIG. 7 is a flow diagram of enumerating the contents of the virus bin to support the View Virus Bin option. At block 358, each file in the virus bin directory may be enumerated. At block 360, each enumerated file in the virus bin may be opened and its virus bin header information may be read. In another embodiment, the virus bin header information may be retrieved from a storage location separate from the scrambled infected file. At block 362, the information contained in the virus bin header may be presented to the user by using a graphical user interface.

Figure 8:
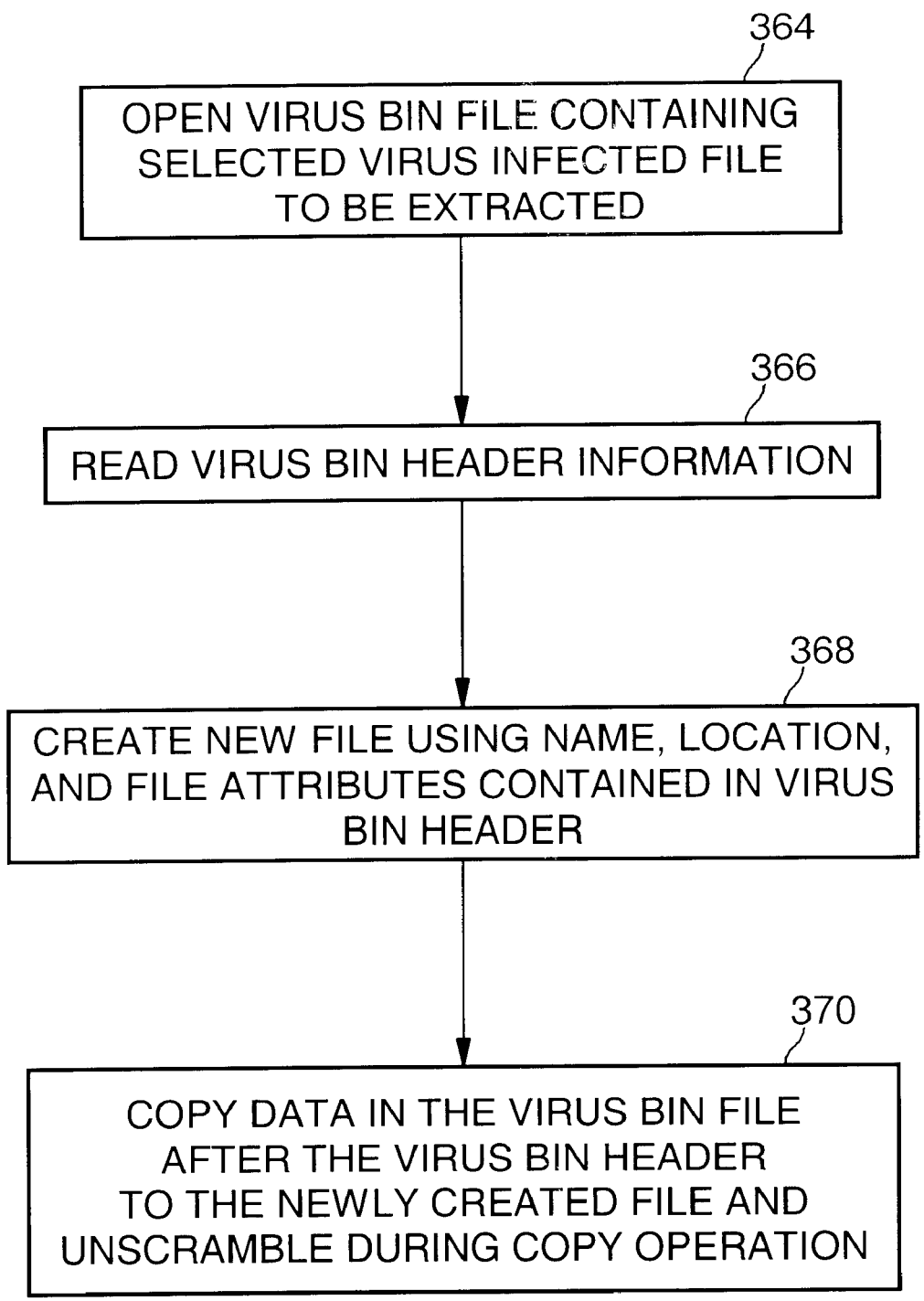
FIG. 8 is a flow diagram of extracting a file from the virus bin according to an embodiment of the present invention.

FIG. 8 is a flow diagram of extracting a file from the virus bin. At block 364, a virus bin file containing a selected virus infected file may be opened. At block 366, the virus bin header information for the selected virus bin file may be read. At block 368, a new file may be created using the name, location, and file attributes contained in the virus bin header information. At block 370, the data from the virus bin file after the virus bin header information may be unscrambled or decrypted and copied to the newly created file. In one embodiment where the virus bin header information is stored in a storage location separate from the scrambled infected file (i.e., the virus bin file), the entire contents of the virus bin file may be copied to the newly created file. The unscrambling or decrypted operation may be performed during the copying operation on a byte by byte basis.

In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 9:
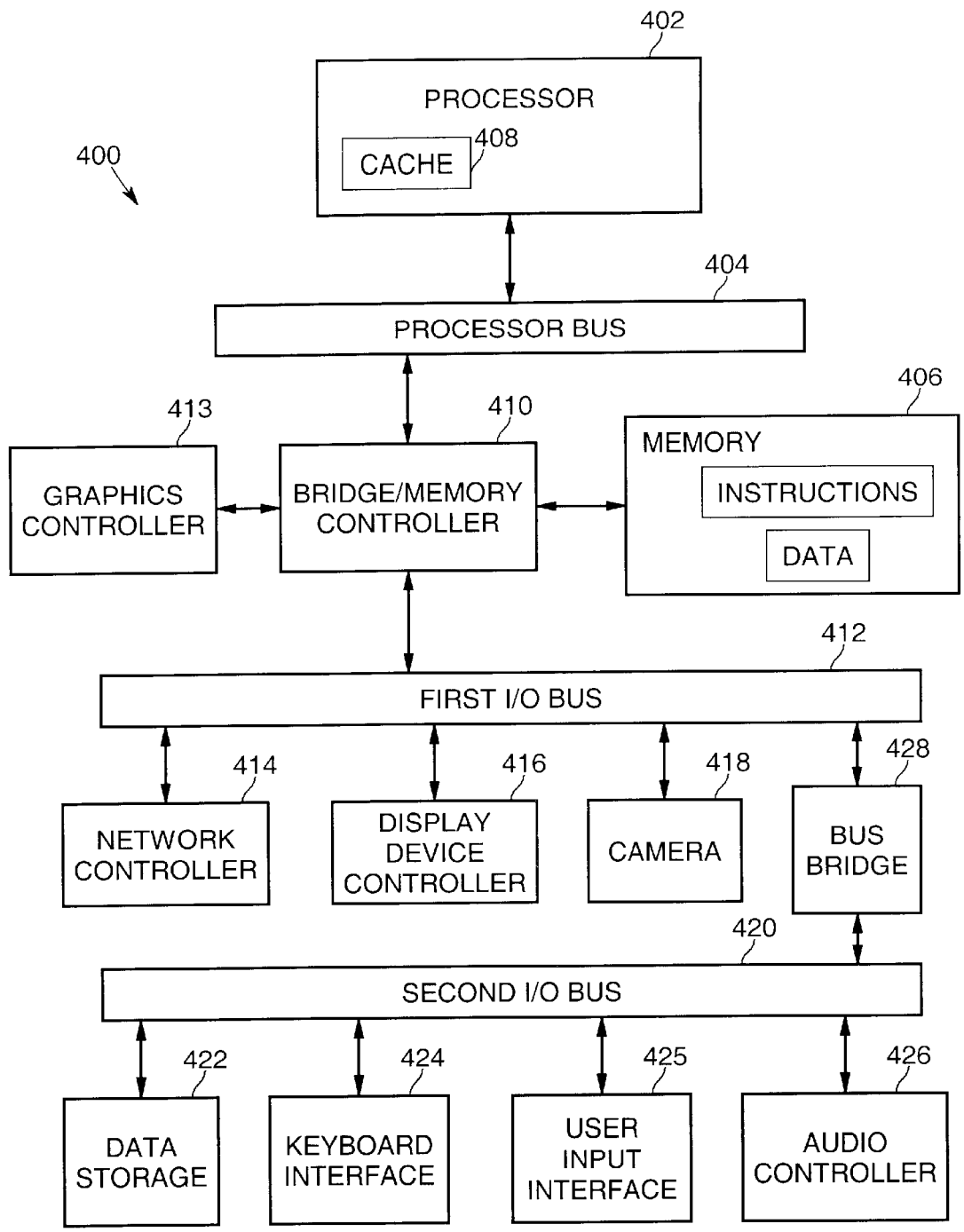
FIG. 9 is a diagram illustrating a sample system suitable to be programmed according to an embodiment of a method for managing virus infected files.

An example of one such type of processing system is shown in FIG. 9. Sample system 400 may be used, for example, to execute the processing for methods in accordance with the present invention, such as the embodiment described herein. Sample system 400 is representative of processing systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

FIG. 9 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal, processor, for example. FIG. 9 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory. 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 9) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In some embodiments, camera 418 may be coupled to the first I/O bus. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to manage computer virus infected files. According to one embodiment, management of computer virus infected files may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to manage virus infected files according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of managing virus infected files in accordance with the present invention, whereas memory 406 is used to store on a shorter term basis the executable instructions of embodiments of the methods for managing virus infected files in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. In a processing system, a method of managing virus infected files comprising:

obtaining, from a user of the processing system, a selected option for handling a virus infected file;

scanning files of the processing system and detecting a virus infected file;

when the selected option comprises moving the virus infected file to a virus file repository, automatically and without user interaction performing:

copying the entire contents of the virus infected file to a first file in the virus file repository, wherein the automatic copying of the virus infected file to the virus file repository is implemented as a scan option in a local area network-based anti-virus process;

scrambling contents of the first file during the copy operation, such that the first file is inoperable and no longer accessible by the user of the processing system;

storing the first file in the virus file repository for subsequent recovery; and deleting the virus infected file from the processing system.

2. The method of claim 1, wherein scrambling contents comprises scrambling contents during copying operations on a byte by byte basis.

3. The method of claim 1, further comprising writing information describing the virus infected file into the first file.

4. The method of claim 3, further comprising:

opening the first file;

reading information describing the virus infected file from the first file;

creating a second file using the information;

copying selected contents of the first file to the second file; and unscrambling contents of the second file.

5. The method of claim 4, wherein unscrambling contents comprises unscrambling contents during copying operations on a byte by byte basis.

6. The method of claim 3, further comprising:

enumerating each file in the directory;

opening each enumerated file and reading the information describing the virus infected file stored in each enumerated file; and displaying the information.

7. The method of claim 1, wherein scrambling contents comprises performing an exclusive OR operation applied to selected bytes of the first file with a OFF value.

8. The method of claim 1, wherein scrambling contents comprises encrypting selected contents of the first file.

9. An article comprising:

a machine readable medium having a plurality of machine readable instructions stored therein, wherein when the instructions are executed by a processor the instructions cause the processor to obtain, from a user of the processing system, a selected option for handling a virus infected file, to scan files of the processing system and detect a virus infected file, and when the selected option comprises moving the virus infected file to a virus file repository, to automatically and without user interaction perform: copying the entire contents of the virus infected file to a first file in a virus file repository, the automatic copying of the virus infected file to the virus file repository are implemented as a scan option in a local area network-based anti-virus process, scrambling contents of the first file during the copy operation, such that the first file is inoperable and no longer accessible by the user of the processing system, storing the first file in the virus file repository for subsequent recovery, and deleting the virus infected file from the processing system.

10. The article of claim 9, wherein the scrambling instructions comprise instructions to scramble the contents during copying operations on a byte by byte basis.

11. The article of claim 9, further comprising instructions to write information describing the virus infected file into the first file.

12. The article of claim 11, further comprising instructions to open the first file, to read information describing the virus infected file from the first file, to create a second file using the information, to copy selected contents of the first file to the second file, and to unscramble contents of the second file.

13. The article of claim 12, wherein unscrambling instructions comprise instructions to unscramble contents during copying operations on a byte by byte basis.

14. The article of claim 11, further comprising instructions to enumerate each file in the directory, to open each enumerated file and read the information describing the virus infected file, and to present the information to a user.

15. The article of claim 9, wherein the scrambling instructions comprise instructions to perform an exclusive OR operation applied to selected bytes of the first file with a OFF value.

16. The article of claim 9, wherein the scrambling instructions comprise instructions to encrypt the first file.

* * * * *